United States Patent [19]

Klein

[11] Patent Number: 5,020,678

[45] Date of Patent: * Jun. 4, 1991

[54] STRUCTURAL RACK

[75] Inventor: Herbert H. Klein, Arlington Heights, Ill.

[73] Assignee: Unarco Industries, Inc., Chicago, Ill.

[*] Notice: The portion of the term of this patent subsequent to Feb. 27, 2007 has been disclaimed.

[21] Appl. No.: 371,926

[22] Filed: Jun. 27, 1989

[51] Int. Cl.$^5$ .............................. A47B 47/00
[52] U.S. Cl. .................... 211/191; 211/182; 403/388; 403/408.1
[58] Field of Search ............... 211/182, 189, 190, 191, 211/193, 192, 207; 403/388, 408.1, 409.1; 411/427, 955, 169

[56] References Cited

U.S. PATENT DOCUMENTS

| | | | |
|---|---|---|---|
| 3,698,566 | 12/1972 | D'Altrui | 211/193 |
| 3,877,579 | 4/1975 | Weider | 211/182 X |
| 4,569,451 | 2/1986 | Parrott et al. | 211/182 X |
| 4,904,110 | 2/1990 | Klein | 411/169 X |

*Primary Examiner*—Alvin C. Chin-Shue
*Attorney, Agent, or Firm*—Dressler, Goldsmith, Shore, Sutker & Milnamow, Ltd.

[57] ABSTRACT

A structural rack comprising a column and a beam, each made from a standard channel with a web and two tapered flanges, and a bolted connection between the column and the beam. The tapered flanges of the beam are notched so as to form an internal corner, into which an external corner of the column is fittable. The bolted connection uses a conventional bolt and a special nut, which has a flange-engaging surface conforming to a curved surface where one of the tapered flanges of the column meets the web of the column. Upon relative movement of the column and the beam as the bolt and the nut are tightened, the flange-engaging surface cams the last-mentioned flange against adjacent edges of the notched flanges, thereby to assemble the beam and the column with the external corner fitted tightly into the internal corner.

9 Claims, 1 Drawing Sheet

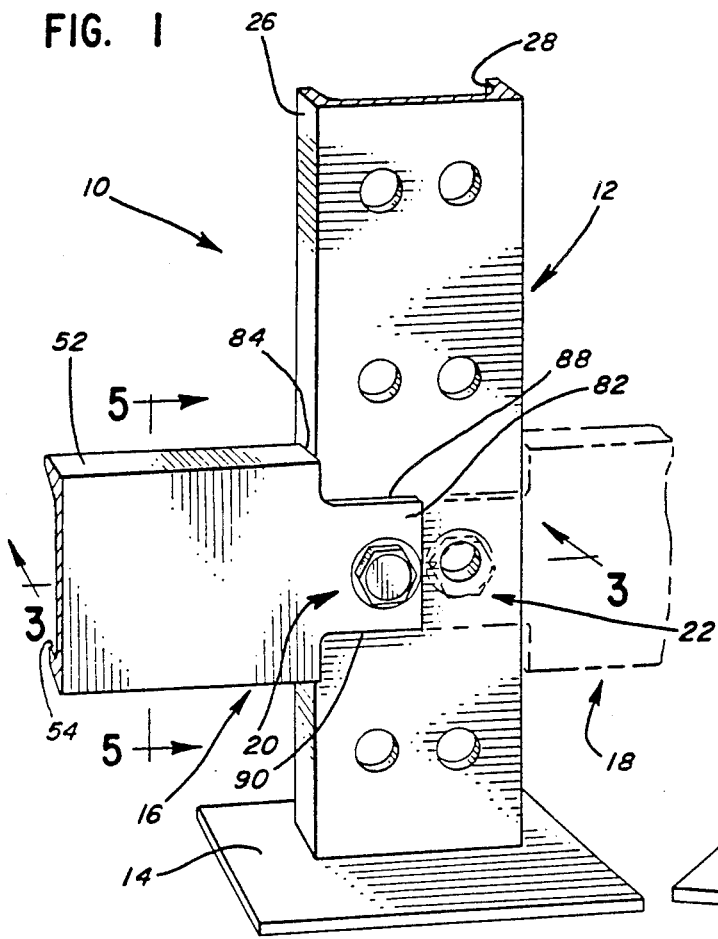
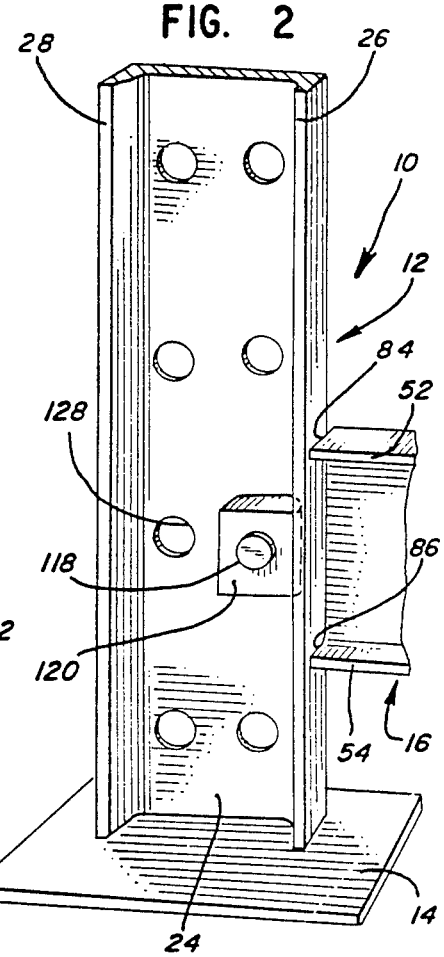
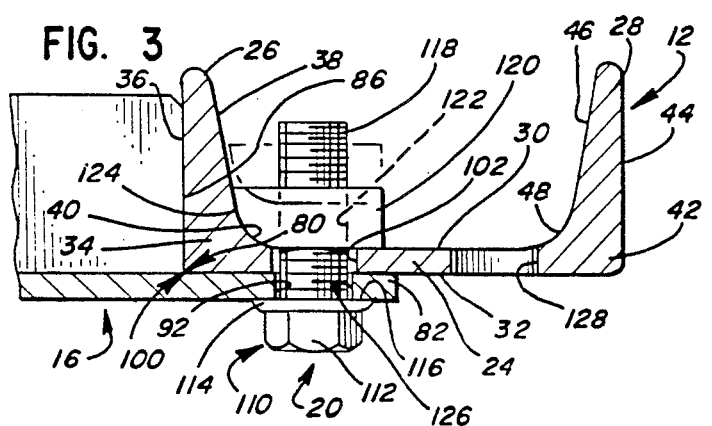
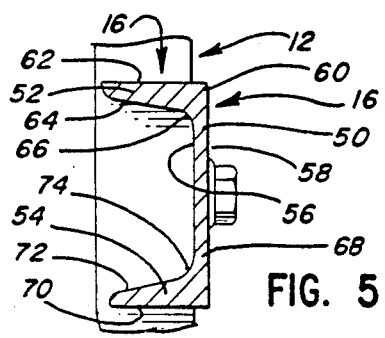
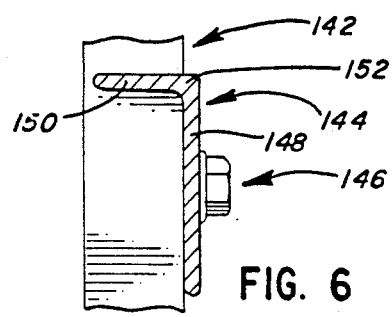

STRUCTURAL RACK

TECHNICAL FIELD OF THE INVENTION

This invention pertains to a structural rack comprising structural members, which are bolted to each other, such as columns and beams. Such racks are used in warehouses and elsewhere.

BACKGROUND OF THE INVENTION

Structural racks comprising structural members, such as columns and beams, are used widely in warehouses and elsewhere. Commonly, such members are bolted to each other, although it is known to weld such members to each other. Bolted racks are preferred over welded racks, in many cases, because bolted racks can be non-destructively disassembled and the horizontal shelf heights can be changed to suit different load heights.

In making such a rack, it is desirable to employ structural members of standard shapes, such as standard channels, wherever possible Because of their shapes, however, it is difficult to bolt standard channels rigidly to each other at column-to-beam connections in such a rack.

One method to bolt structural members to each other at column-to-beam connections in a structural rack is disclosed in Konstant U.S. Pat. No. 4,678,091. Such patent discloses a bolt having a hexagonal head and extending through respective overlapping but offset apertures in the respective members, so that the bolt provides what is described as "lever action" against the apertures as a hexagonal nut is tightened onto the bolt.

Although the method described in the preceding paragraph may be generally effective, it is necessary to use two wrenches, namely one wrench to hold the nut and another to turn the bolt head. Because the nut is close to a flange of the structural member used as a column, it is difficult to apply a wrench to hold the nut. Moreover, dimensional tolerances needed for the overlapping but offset apertures are difficult to achieve.

Other methods to connect structural members to each other in a structural rack are disclosed in Vincens U.S. Pat. No. 3,398,981, D'Altrui U.S. Pat. No. 3,554,477, McConnell U.S. Pat. No. 4,078,664, and Harmes et al. U.S. Pat. No. 4,291,812.

There has remained a need, to which this invention is addressed, for a better way to bolt structural members, such as standard channels, to each other in a structural rack, as at a column-to-beam connection.

SUMMARY OF THE INVENTION

This invention provides a structural rack comprising a first structural member, such as a beam, and a second structural member, such as a column, with a novel connection between the first and second structural members. The structural rack provided by this invention is useful in a warehouse or elsewhere.

Broadly, the structural rack comprises first and second structural members, which are adapted to be connected to one another. Abutment means, as provided on the structural members, are adapted to abut one another when such members are connected. Apertures in the structural members are positionable in alignment with one another when such members are connected. A fastener extends through the apertures when such members are connected.

A cam means is provided, which has a cam surface adapted to engage one of the structural members as the cam means is moved axially along the fastener, thereby to effect relative movement between such members so as to bring the abutment means into abutment with one another. The fastener is required to bear against the internal margin of only one of the apertures as the cam means effects such movement.

Preferably, at least one of the structural members has a web, which has the aperture of such member, and a flange, which extends at an angle from the web. Thus, the cam means is adapted to engage the flange as the cam means is moved axially along the fastener, as mentioned above. Preferably, the flange constitutes the abutment means of such member.

Each of the first and second structural members can be advantageously made from a standard channel. Characteristically, a standard channel has a web and two tapered flanges, which extend from two lateral edges of the web. Such flanges have outer surfaces parallel to each other and normal to the web. Such flanges have inner surfaces flaring outwardly as the tapered flanges extend away from the web, whereby the inner surface of each tapered flange inclines toward the outer surface of such tapered flange as such tapered flange extends away from the web.

Thus, in a preferred construction, the first structural member has a web and a flange extending from the web, as from one edge of the web, in generally normal relation to the web. The flange is notched so as to form an internal corner, which is defined by the web and by an adjacent edge of the notched flange. A bolt shank-extending aperture extends through the web.

Also, in the preferred construction, the second structural member has a web with parallel inner and outer surfaces and with two lateral edges and a tapered flange extending from one of the lateral edges of the web in generally normal relation to the web. The tapered flange has an outer surface normal to the inner and outer surfaces of the web and an inner surface inclining toward the outer surface as the tapered flange extends away from the web. The outer surface of the tapered flange and the outer surface of the web define an external corner, which is fittable loosely or tightly into the internal corner with the web disposed against the web of the first structural member A bolt shank-receiving aperture, which extends through the web of the second structural member, is disposed so as to be generally aligned with the bolt shank-receiving aperture of the first structural member when the external corner is fitted loosely or tightly into the internal corner with the web of the second structural member disposed against the web of the first structural member.

Preferably, each of the first and second structural members has a web with two lateral edges and a tapered flange extending from each of the lateral edges of the web. Each tapered flange has an outer surface normal to the web and an inner surface inclining progressively toward the outer surface of such tapered flange as such tapered flange extends progressively away from the web. Thus, each of the first and second structural members can be advantageously made from a standard channel, which is characterized by, among other features, such a web and by such tapered flanges.

If the first structural member has a web and two tapered flanges, as mentioned above, the tapered flanges of the first structural member are notched, preferably along two orthogonal planes, so as to form an internal corner, which is defined by the web and by adjacent edges of the notched flanges. Also, as mentioned above, a bolt shank-receiving aperture extends through the web of the first structural member.

In the preferred construction, a bolt is provided, which has a head and a threaded shank. The threaded shank, which defines an axis, is adapted to be axially extended through the bolt shank-receiving aperture of the first structural member and then through the bolt shank-receiving aperture of the second structural member when the external corner is fitted loosely or tightly into the internal corner. The bolt shank-receiving aperture of the second structural member is sized so as to permit the threaded shank to be loosely extended therethrough.

In the preferred construction, a nut is provided, which has a threaded hole and a flange-engaging surface. The threaded hole is arranged to receive the threaded shank of the bolt. The flange-engaging surface is adapted to engage the inner surface of the adjacent flange, namely the flange whose outer surface with the outer surface of the web of the second structural member defines the external corner, upon relative movement of the first and second structural members as the bolt and the nut are tightened.

By engaging such flange surface, the flange-engaging surface prevents the nut from rotating with the threaded shank. Moreover, the flange-engaging surface cams the same flange against the adjacent edge of the notched flange (or against the adjacent edges of the notched flanges) with the threaded shank bearing against the internal margin of the bolt shank-receiving aperture of the first structural member at a location opposite diametrically to the flange whose inner surface is engaged by the flange-engaging surface. Thus, the first and second structural members are assembled with the external corner fitted tightly into the internal corner.

If the first structural member has two tapered flanges, which are notched so as to form the internal corner, the bolted connection between the first and second members prevents relative rotation of the first and second members about the threaded shank of the bolt.

These and other objects, features, and advantages of this invention are evident from the following description of a preferred embodiment of this invention with reference to the accompanying drawing.

BRIEF DESCRIPTION OF THE DRAWINGS

FIGS. 1 and 2 are fragmentary, perspective views of a column and a beam, as connected to each other by a bolted connection, in a structural rack embodying this invention, as taken from different vantages Another beam is shown in FIG. 1, in phantom lines, as connected similarly to the column.

FIG. 3 is an enlarged, sectional view taken along line 3—3 of FIG. 1, in a direction indicated by arrows, and showing the column, the first-mentioned beam, and the bolted connection, which is not sectioned.

FIG. 4 is a further enlarged, perspective view of a special nut used in the bolted connection shown in FIG. 3.

FIG. 5 is a fragmentary, sectional view taken along line 5—5 of FIG. 1, in a direction indicated by arrows.

FIG. 6 is a fragmentary, sectional view similar to FIG. 5 but showing a beam made from a standard angle instead of the beam shown in FIG. 5.

DETAILED DESCRIPTION OF PREFERRED EMBODIMENTS

As shown in FIGS. 1 and 2, a structural rack 10, which is useful in a warehouse or elsewhere, constitutes a preferred embodiment of this invention. The structural rack 10 comprises upright columns exemplified by a column 12, which has a rectangular pad 14 welded to its lower end, and transverse beams exemplified by a beam 16, which is shown in full lines, and by a beam 18, which is shown in phantom lines. The beam 18, which is similar to the beam 16, is aligned transversely with the beam 16 The beams are connected rigidly to the columns by bolted connections exemplified by a bolted connection 20, which is shown in full lines, and by a bolted connection 22, which is shown in phantom lines.

The columns exemplified by the column 12 and the beams exemplified by the beam 16, and by the beam 18, are made from standard channels of structural steel, such as American standard channels, which are described in standard references including American Institute of Steel Construction, Inc., *Manual of Steel Construction,* 8th Edition (1970). Characteristically, a standard channel has a web, which has parallel inner and outer surfaces, and two tapered flanges, which extend from two lateral edges of the web, which have outer surfaces parallel to each other and normal to the web, and which have inner surfaces flaring outwardly as the tapered flanges extend outwardly away from the web, whereby the inner surface of each tapered flange inclines toward the outer surface of such tapered flange as such tapered flange extends away from the web.

Thus, the column 12 has a web 24, a first tapered flange 26, and a second tapered flange 28. The web 24 has an inner surface 30 and an outer surface 32, which is parallel to the inner surface 30. The first tapered flange 26 which extends from a first lateral edge 34 of the web 22 in generally normal relation to the web 22, has an outer surface 36, which is normal to the inner and outer surfaces of the web 24, and an inner surface 38, which inclines toward the outer surface 36 as the first tapered flange 26 extends away from the web 24. The inner surface 38 of the first tapered flange 26 and the inner surface 30 of the web 22 merge at a curved surface 40.

The second tapered flange 28, which is similar to the first tapered flange 26, and which extends from a second lateral edge 42 of the web 24 in generally parallel relation to the first tapered flange 26 and in generally normal relation to the web 24, has an outer surface 44, which is normal to the inner and outer surfaces of the web 24, and an inner surface 46, which inclines toward the outer surface 44 as the second tapered flange 28 extends away from the web 24. The inner surface 46 of the second tapered flange 28 and the inner surface 30 of the web 24 merge at a curved surface 48, which is similar to the curved surface 40. The inner surface 38 of the first tapered flange 26 and the inner surface 46 of the second tapered flange 28 flare outwardly as the first tapered flange 26 and the second tapered flange 28 extend away from the web 22.

Also, the beam 16 has a web 50, a first tapered flange 52, and a second tapered flange 54. The web 50 has an inner surface 56 and an outer surface 58, which is parallel to the inner surface 56. The first tapered flange 52, which extends from a first lateral edge 60 of the web 50, has an outer surface 62, which is normal to the inner and outer surfaces of the web 50, and an inner surface 64, which inclines toward the outer surface 62 as the first tapered flange 52 extends away from the web 50. The inner surface 64 of the first tapered flange 52 and the inner surface 56 of the web 50 merge at a curved surface 66.

The second tapered flange 54, which is similar to the first tapered flange 52, and which extends from a second lateral edge 68 of the web 52 in generally parallel relation to the web 50, has an outer surface 70, which is normal to the inner and outer surfaces of the web 50, and an inner surface 72, which inclines toward the outer surface 70 as the second tapered flange 54 extends away from the web 50. The inner surface 72 of the second tapered flange 54 and the inner surface 56 of the web 50 merge at a curved surface 74, which is similar to the curved surface 66. The inner surface 64 of the first tapered flange 52 and the inner surface 72 of the second tapered flange 54 flare outwardly as the first tapered flange 52 and the second tapered flange 54 extend away from the web 50.

Each tapered flange of the beam 16 is notched, along two orthogonal planes, so as to form an internal corner 80, which is defined by a tongue-like portion 82 of the web 50 (where the web 50 has parallel inner and outer surfaces, as mentioned above, between the curved surfaces 64, 74) and by an adjacent edge 84 of the tapered flange 52 (see FIG. 1) and an adjacent edge 86 of the tapered flange 54.

Thus, the tapered flange 52 is notched, along a plane parallel to the outer surface 62 of the tapered flange 52 and normal to the inner and outer surfaces of the web 50, so as to define a first lateral edge 88 of the tongue-like portion 82 of the web 50, and along a plane normal to the outer surface 62 of the tapered flange 52 and normal to the inner and outer surfaces of the web 50, so as to define the adjacent edge 84 of the tapered flange 52.

Also, the tapered flange 54 is notched, along a plane parallel to the outer surface 70 of the tapered flange 54 and normal to the inner and outer surfaces of the web 50, so as to define a second lateral edge 90 of the tongue-like portion 82 of the web 50, and along a plane normal to the outer surface 70 of the tapered flange 54 and normal to the inner and outer surfaces of the web 50, so as to define the adjacent edge 86 of the tapered flange 54.

The plane noted above as parallel to the outer surface 62 of the tapered flange 52 and the plane noted above as parallel to the outer surface 70 of the tapered flange 54 are spaced from each other, between the curved surfaces 64, 74, so that the inner and outer surfaces of the tongue-like portion 82 are parallel to each other, and so that its lateral edges 88, 90, are parallel to each other. The plane noted above as normal to the outer surface 62 of the tapered flange 5 and the plane noted above as normal to the outer surface 70 of the tapered flange 54 coincide with each other. A bolt shank-receiving aperture 92 extends through the tongue-like portion 82 of the web 50 of the beam 16.

On the column 12, the outer surface 36 of the first tapered flange 26 and the outer surface 32 of the web 24 define an external corner 100, which is fittable loosely or tightly into the internal corner 80 with the web 24 of the column 12 being disposed against the web 50 of the beam 16. A bolt shank-receiving aperture 102 extends through the web 24 of the column 12. The aperture 102 is disposed so as to be generally aligned with the aperture 92 of the beam 16 when the external corner 100 is fitted loosely or tightly into the internal corner 80 with the web 24 being disposed against the web 50.

The bolted connection 20 uses a conventional bolt 110, which has a hexagonal head 112, an integral washer 114 with a knurled surface 116, and a threaded shank 118, which defines an axis. The threaded shank 118 is adapted to be axially inserted through the aperture 92 of the beam 16 and then through the aperture 102 of the column when the external corner 100 is fitted loosely or tightly into the internal corner. The aperture 92, which may be slightly larger than the aperture 102, is sized so as to permit the threaded shank 118 to be loosely extended through the aperture 92.

The bolted connection 20 uses a special nut 120, which has a threaded hole 122 and a flange-engaging surface 124. The threaded hole 122 is arranged to receive the threaded shank 118. The flange-engaging surface 124, which is curved so as to conform to the curved surface 40 where the inner surface 38 of the tapered flange 26 and the inner surface 30 of the web 24 merge, is adapted to engage the inner surface 38 of the tapered flange 26 and the curved surface 40, upon relative movement of the column 12 and the beam 16 as the bolt 110 and the nut 120 are tightened. Thus, the nut 120 is prevented from rotating with the threaded shank 118. Also, the tapered flange 26 is cammed against the adjacent edge 84 of the notched flange 52 and against the adjacent edge 86 of the notched flange 54, with the threaded shank 118 bearing against the internal margin of the aperture 92 of the beam 16 at a location 126 opposed diametrically to the tapered flange 26.

Thus, when the bolt 110 and the nut 120 are tightened, the column 12 and the beam 16 are assembled rigidly with external corner 100 fitted tightly into the internal corner 80, and with the flange-engaging surface 124 of the nut 120 in surface-to-surface contact with the inner surface 40 of the tapered flange 26 and with the curved surface 66. Surface-to-surface contact is preferable to edge-to-surface or point-to-surface contact.

As shown, the threaded shank 118 extends between a plane including the outer surface 62 of the notched flange 52 and a plane including the outer surface 70 of the notched flange 54. Thus, the bolted connection 20 between the column 12 and the beam 16, as defined by the bolt 110 and the nut 120, prevents relative rotation between the column 12 and the beam 16 when the external corner 100 is fitted tightly into the internal corner 80.

The column 12 is provided with a bolt shank-receiving aperture 128, which is similar to the aperture 102, and which is spaced transversely from the aperture 102. Thus, the beam 18 is connected to the column 12, via the bolted connection 22, which utilizes the aperture 128. The column 12 is provided with other pairs of similar apertures, as shown, which permit the beam 16, the beam 18, or both beams to be adjustably repositioned in respective higher or lower locations.

As shown in FIG. 6, a structural rack 140 constituting an alternative embodiment of this invention comprises a column 142, which is similar to the column 12, a beam 144, which is made from a standard angle, and a bolted connection 146, which is similar to the bolted connection 20. Standard angles are described in *Manual of Steel Construction, supra.*

Thus, the beam 144 has a web 148, which is analogous to the web 50 of the beam 16, and a single flange 150, which is analogous to one of the tapered flanges 52, 54, of the beam 16. The single flange 150, which extends from the web 148, along one lateral edge 152 of the web 148, in generally normal relation to the web 148, is notched (as each of the tapered flanges 52, 54, of the beam 16 is notched) so as to form an internal corner (not shown) which is analogous to the internal corner 80, and which is defined by the web 148 and by an adjacent edge (not shown) of the notched flange 150. The bolted connection 146, which functions as the bolted connection 20 functions, connects the beam 144 to the column 12.

Other modifications may be also or instead made without departing from the scope and spirit of this invention.

I claim:

1. A structural rack comprising: first and second structural members adapted to be connected to one another and having abutment means thereon, said abutment means being adapted to abut when said structural members are connected; and an aperture in each of said structural members, each said aperture having an internal margin, said apertures being positionable in alignment with one another when said structural members are connected; a fastener defining an axis and extending through said apertures when said structural members are connected; and cam means having a cam surface engaging one of said structural members as said cam means is moved axially along said fastener thereby to effect relative movement between said structural members so as to bring said abutment means into abutment; wherein said fastener bears against the internal margin of one said aperture of said first structural member as the cam means effects said movement.

2. The structural rack of claim 1 wherein at least one of said members has a web, said web having one of said apertures and a flange, which extends at an angle from said web, said cam means being adapted to engage said flange as said cam means is moved axially along said fastener, thereby to effect relative movement between said members so as to bring said abutment means into abutment with one another.

3. The structural rack of claim 2 wherein said flange constitutes a part of said abutment means of said members.

4. A structural rack comprising:

(a) a first structural member having a web and a flange extending from the web in generally normal relation to the web, the flange being notched so as to form an internal corner defined by the web and by an adjacent edge of the notched flange, the first structural member having a bolt shank-receiving aperture having an internal margin, the bolt shank-receiving aperture extending through the web;

(b) a second structural member having a web with parallel inner and outer surfaces and with two lateral edges and a tapered flange extending from one of the lateral edges in generally normal relation to the web of the second structural member, the tapered flange having an outer surface normal to the web of the second structural member and an inner surface inclining toward the outer surface of the tapered flange as the tapered flange extends away from the web of the second structural member, the outer surface of the tapered flange and the outer surface of the web of the second structural member defining an external corner fittable into the internal corner of the first structural member with the web of the second structural member disposed against the web of the first structural member, the second structural member having a bolt shank-receiving aperture extending through the web of the second structural member, the bolt shank-receiving aperture of the second structural member being disposed so as to be generally aligned with the bolt shank-receiving aperture of the first structural member when the external corner is fitted into the internal corner with the web of the second structural member disposed against the web of the first structural member;

(c) a bolt having a head and a threaded shank, which defines an axis, and which is adapted to be axially extended through the bolt shank-receiving aperture of the first structural member and then through the bolt shank-receiving aperture of the second structural member when the external corner is fitted into the internal corner, the bolt shank-receiving aperture of the second structural member being sized so as to permit the threaded shank to be loosely extended therethrough; and (d) a nut having a threaded hole arranged to receive the threaded shank and having a flange-engaging surface adapted to engage the inner surface of the tapered flange of the second structural member, upon relative movement of the first and second structural members as the bolt and the nut are tightened, so as to cam the tapered flange of the second structural member against the adjacent edge of the notched flange with the thread shank bearing against the internal margin of the bolt shank-receiving aperture of the first structural member at a location opposed diametrically to the tapered flange of the second structural member, thereby to assemble the first and second structural members with the external corner fitted tightly into the internal corner of the first structural member.

5. The structural rack of claim 4 wherein the flange of the first structural member extends from one edge of and in generally normal relation to the web of the first structural member.

6. A structural rank comprising:

(a) a first structural member having a web with parallel inner and outer surfaces and with two lateral edges and a tapered flange extending from each of the lateral edges of the web in generally normal relation to the web, each tapered flange having an outer surface normal to the inner and outer surfaces of the web and an inner surface inclining toward the outer surface of said tapered flange as such tapered flange extends progressively away from the web, the tapered flanges being notched so as to form an internal corner defined by the web and by adjacent edges of the notched flanges, the first structural member having a bolt shank-receiving aperture having an internal margin, the bolt shank-receiving aperture extending through the web;

(b) a second structural member having a web with parallel inner and outer surfaces and with two lateral edges, a tapered flange extending from each of the lateral edges of the web of the second structural member in generally normal relation to the web of the second structural member, each said tapered flange of the second structural member having an outer surface normal to the web of the second structural member and an inner surface inclining toward the outer surface of said tapered flange of the second structural member as said tapered flange of the second structural member extends away from the web of the second structural member, the outer surface of a selected one of the tapered flanges of the second structural member and the outer surface of the web of the second structural member defining an external corner fittable into the internal corner with the web of the second structural member being disposed against the web of the first structural member, the second structural member having a bolt shank-receiving aperture extending through the web of the second structural member, the bolt shank-receiving aperture of the second structural member being disposed so as to be generally aligned with the bolt shank-receiving aperture of the first structural member when the external corner is fitted or into the internal corner with the web of the second structural member disposed against the web of the first structural member;

(c) a bolt having a head and a threaded shank, which defines an axis, and which is being adapted to be axially extended through the bolt shank-receiving aperture of the first structural member and then through the bolt shank-receiving aperture of the second structural member when the external corner is fitted into the internal corner, the aperture of the second structural member being sized so as to permit the treated shank to be loosely extended therethrough; and (d) a nut having a threaded hole arranged to receive the threaded shank and having a flange-engaging surface adapted to engage the inner surface of the selected one of the tapered flanges of the second structural member, upon relative movement of the first and second structural members as the bolt and the nut are tightened, so as to prevent the nut from rotating with the threaded shank, and so as to cam the selected one of the tapered flanges of the second structural member against the adjacent edges of the notched flanges with the threaded shank bearing against the internal margin of the bolt shank-receiving aperture of the first structure member at a location opposed diametrically to the selected one of the tapered flanges of the second structural member, thereby to assembly the first and second structural members with the external corner fitted into the internal corner.

7. The structural rack of claim 6 wherein each of the first and second structural members is made from a standard channel.

8. The structural rack of claim 6 wherein each of the tapered flanges of the first structural member is notched, along two orthogonal planes, so that the web of the first structural member has a tongue-like portion, which with the adjacent edges of the notched flanges defines the internal corner, and through which the bolt shank-receiving aperture of the first structural member extends.

9. The structural rack of claim 8 wherein each of the first and second structural members is made from a standard channel.

* * * * *

UNITED STATES PATENT AND TRADEMARK OFFICE
CERTIFICATE OF CORRECTION

PATENT NO. : 5,020,678

DATED : June 4, 1991

INVENTOR(S) : Herbert H. Klein

It is certified that error appears in the above—identified patent and that said Letters Patent is hereby corrected as shown below:

Column 5, line 55, "5" should be --52--.

Column 8, line 29, "thread" should be --threaded--.

Column 8 line 41 (claim 6), "rank" should be --rack--.

Signed and Sealed this

Twenty-ninth Day of September, 1992

Attest:

DOUGLAS B. COMER

Attesting Officer

Acting Commissioner of Patents and Trademarks